UNITED STATES PATENT OFFICE.

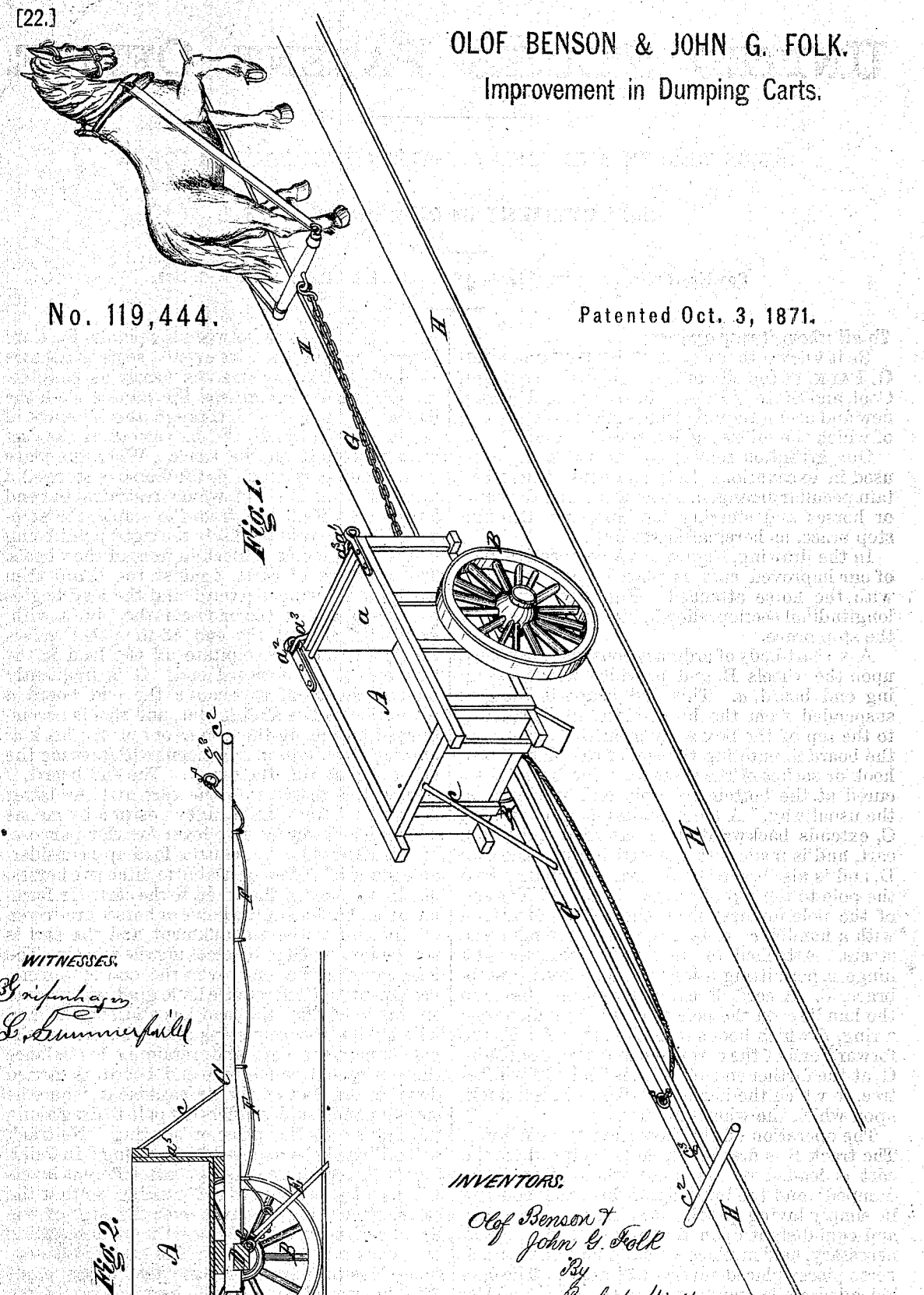

OLOF BENSON AND JOHN G. FALK, OF CHICAGO, ILLINOIS.

IMPROVEMENT IN DUMPING-CARTS.

Specification forming part of Letters Patent No. 119,444, dated October 3, 1871.

*To all whom it may concern:*

Be it known that we, OLOF BENSON and JOHN G. FALK, of the city of Chicago, in the county of Cook and State of Illinois, have invented certain new and useful Improvements in Dumping-Carts, of which the following is a specification:

Our invention relates to carts desired to be used in excavations, &c.; and consists in a certain peculiar arrangement for attaching the horse or horses and steering the cart, and also in a stop-brace, as hereinafter set forth.

In the drawing, Figure 1 is a perspective view of our improved cart as placed upon its track, with the horse attached. Fig. 2 is a vertical longitudinal section, showing the arrangement of the stop-brace.

A is a cart-body of ordinary construction placed upon the wheels B, and provided with a swinging end board, $a$. This end board is hung or suspended from the hinge-plates $a^1$ $a^2$ attached to the top of the box A by means of arms $a^3$ on the board $a$, entering the eye of the plate $a^1$ and hook or socket of the plate $a^2$. The board is secured at the bottom by a pin and staple, $a^4$, in the usual way. A long guiding-pole or rudder, C, extends backward from the hind end of the cart, and is made fast by mortising into the axle D, and is also braced by the arm $c$ extending from the pole to the top of the end board $a^5$. The end of the pole furthest from the cart is furnished with a handle, $c^1$, to be grasped by the man who steers. Attached to the axle D, by means of a hinge, $e$, permitting a free vertical play, is a stop-brace, E. A cord, F, extends from this brace to the handle $c^1$ on the pole C, and is provided with a ring, $f$, which hooks over the catch $c^2$. To the forward end of the cart is secured a rope or chain, G, at the further end of which is hooked a whiffle-tree, to which the horse is hitched. H is a track, upon which the wheels B move.

The operation of the invention is as follows: The track B is first laid from the point where the cart is loaded to the place where it is to be dumped; and the building of this track consists in simply laying planks parallel to each other and equi-distant upon the ground, and, if found necessary, held in place by nailing them to transverse pieces placed several feet apart. The cart is loaded while standing upon the track and the horse, being attached to the whiffletree at the end of the chain G, is started and made to proceed along the track between the planks B. Care is taken to load the cart evenly, so as to balance the body on the axle-tree as nearly as possible. At starting a man grasps the handle $c^1$ on the end of the pole C and through the leverage of the long pole directs the movement of the cart so as to keep it on the track. When the place of unloading is reached the horse is stopped a moment until the pin which restrains the end board $a$ is withdrawn from the staple, the stopping of the cart at precisely the right point being insured by placing a block in front of the wheels. The pressure of earth against the board then causes it to swing outward and the load begins to slide out. At the moment the pin is withdrawn the man at the end of the pole C raises the pole so as to precipitate all the load in the cart out at the forward end. It is frequently found convenient to remove the end board $a$ while the load is sliding out, and this is accomplished by raising the arm $a^3$ out of the hook $a^2$ and then by a lateral movement withdrawing the other arm $a^3$ from the eye $a^1$. The end board, if removed, is tossed into the cart and the latter tipped back into an upright position by means of the pole C acting as a lever for this purpose. If it is required to convey the load up a considerable grade it is often desirable to hitch two horses, one in advance of the other, to the cart. In forming an embankment the horse or horses are driven off the end of the embankment and the cart is stopped on its edge by blocking the wheels. The load can thus be shot over the end of the embankment and will require little grading by hand. In this case, after the load has slid out, the man who guides the cart steps upon the end of the pole C next the cart and, retaining his balance thereon by holding to the end board, is carried down to the foot of the embankment, where he steps off and usually suffers the pole to drag along the ground to the place of starting. No track will ordinarily be required in returning. In building high embankments several different levels will usually be made in the grading, so that the carts, after being dumped over the edge of one level, can be turned about without descending an inconvenient distance. The use of the stop-brace E is to prevent any accident which might arise in ascending a grade by breaking of the chain G, or from any other breakage. The brace may be suffered to drag along the ground or be held free from it by hooking the ring $f$ on the cord F over the catch $c^2$.

The advantages secured by this manner of construction are important. The most valuable consideration is that of the saving of horse-power. By this arrangement of cart and track one horse can always do the work of two where no track is used, and often that of five or six.

The tracks heretofore used have usually been made with grooves or rails, in both which cases there is difficulty in getting on and off them, and it requires a costly amount of time and labor to lay them. A track laid in the manner described in connection with this invention would not be practicable for ordinary dirt-wagons, as the space left between planks of the necessary width to form the track would not leave sufficient space for two horses to work abreast. Neither could an ordinary wagon or cart be made to precipitate its load over the end of a bank without turning about or backing. The time saved, as well as horse-power, is also considerable, the cart being brought directly to the spot where it is to be dumped, the smallest possible amount of space consumed in that operation, and then without any stopping for adjustment of parts proceeding to the place of loading. The whole arrangement is simple, cheap, and convenient in use. The saving to the inventors by its use has been found to amount to a considerable sum.

What we claim as our invention, and desire to secure by Letters Patent, is—

1. A dumping-cart, provided with a guiding-pole or rudder, C, projecting from its rear end, and a rope or chain, G, secured to the front end for the purpose of attaching a horse, arranged and operating substantially in the manner described, and for the object set forth.

2. In combination with a cart arranged as described the stop-brace E, either with or without the cord F, as shown and described.

In witness whereof we have hereunto signed our names in the presence of two subscribing witnesses.

OLOF BENSON.
JOHN G. FALK.

Witnesses:
C. C. PECK,
GEO. W. MIATT.